United States Patent
Honda et al.

(10) Patent No.: US 7,031,610 B2
(45) Date of Patent: Apr. 18, 2006

(54) DIFFRACTION-COMPENSATED INTEGRATED WDM

(75) Inventors: Tokuyuki Honda, Sunnyvale, CA (US); Robert R. McLeod, Morgan Hill, CA (US)

(73) Assignee: JDS Uniphase Corporation, San Jose, CA (US)

( * ) Notice: Subject to any disclaimer, the term of this patent is extended or adjusted under 35 U.S.C. 154(b) by 587 days.

(21) Appl. No.: 10/160,636

(22) Filed: Jun. 3, 2002

(65) Prior Publication Data
US 2003/0002787 A1   Jan. 2, 2003

Related U.S. Application Data

(60) Provisional application No. 60/297,435, filed on Jun. 13, 2001.

(51) Int. Cl.
    *G02B 6/30*   (2006.01)
(52) U.S. Cl. .............................. 398/85; 385/24; 385/37
(58) Field of Classification Search ................. 398/79, 398/82–85, 88, 96; 385/18, 24, 34, 37, 33, 385/39, 42, 43, 47, 48; 359/722
    See application file for complete search history.

(56) References Cited

U.S. PATENT DOCUMENTS 5,859,717 A   1/1999   Scobey et al. ............... 359/124
6,453,094 B1 *   9/2002   Yue .............................. 385/37
6,751,373 B1 *   6/2004   Jeong ........................... 385/24

OTHER PUBLICATIONS

Haruo Takashashi, Temperature Stability of Thin-film narrow-bandpass filters produced by ion-assisted deposition, Feb. 1, 1995, vol. 34, N. 4, Applied Optics, pp. 667-675.
G. P. Agrawal, Fiber Communication Systems 2$^{nd}$ Ed., John Wiley & Sons (1997), pp. 28-29.
B.E.A. Saleh & M.C. Teich, Fundamentals of Photonics, John Wiley & Sons (1991) Chapter 3, pp. 80-107.
B.E.A. Saleh & M.C. Teich, Fundamentals of Photonics, John Wiley & Sons (1991), p. 16.

* cited by examiner

*Primary Examiner*—David C. Payne
(74) *Attorney, Agent, or Firm*—Allen, Dyer, Doppelt Milbrath & Gilchrist, P.A.

(57) ABSTRACT

A diffraction-compensated WDM (wavelength division multiplexer) uses TTFs (thin film filters) as concave mirrors. The WDM has a plurality of filter elements for guiding the optical signal along a predetermined optical path, each filter element being transparent to a predetermined wavelength range and including compensating means for at least partially compensating for diffraction of the optical signal. Each filter element has a thin film coated on a substrate, and the compensating means is a curved surface of each thin film. The WDM is more robust than prior art WDM devices using flat TTFs.

10 Claims, 6 Drawing Sheets

DIFFRACTION-COMPENSATED INTEGRATED WDM

CROSS-REFERENCE TO RELATED APPLICATION

The present application claims priority from provisional application serial No. 60/297,435 filed on Jun. 13, 2001, which is incorporated herein by reference.

FIELD OF THE INVENTION

The instant invention relates to wavelength division multiplexing devices, and in particular, to diffraction-compensated integrated wavelength division multiplexing devices.

BACKGROUND OF THE INVENTION

Wavelength division multiplexing (WDM) has been used to increase the capacity of existing fiber optic networks. In these systems, a plurality of optical signal channels are carried over a single optical fiber with each channel being assigned a particular wavelength.

A WDM device can be used to multiplex the plurality of optical signal channels into a single optical signal (e.g., a multiplexer), or demultiplex a single optical signal corresponding to a plurality of optical signal channels into the individual channels (e.g., a demultiplexer). Typically, state-of-the art WDM devices are based on thin-film filters (TFFs), wherein standard deposition processes are used to create narrow-band transmission filters, one for each channel to be multiplexed. The specifications of these unpackaged filters depend on the technology used to create them, however, a reflection loss of 0.2 dB is typical.

FIG. 1 illustrates one embodiment of a prior art multiplexing device using TFFs. The multiplexing device includes a single TFF and two gradient index (GRIN) lenses packaged as a three-port device. Each port of the multiplexing device is coupled to a separate optical fibre, namely, the input port, the upgrade, and the add/drop port. Due to the inherent aberrations of the GRIN lenses, the loss of this device is roughly 0.3 dB greater than the unpackaged filter.

To create a WDM module (i.e., a device which has more than one add/drop channel) with this technology, a set of three-port devices, one for each wavelength to be dropped or added, are made. These three-port devices are then cascaded with fiber connections to create a module. Typical specifications for such modules are given in Table 1.

TABLE 1

Typical specifications for thin film filter WDMs.

| Channel Count | | 8 | 16 |
|---|---|---|---|
| Channel Spacing | [GHz] | 100 | 100 |
| Insertion Loss | [dB] | 4 | 6 |
| Insertion Loss Uniformity | [dB] | 1.5 | 2 |
| Adj. Channel Crosstalk | [dB] | −25 | −25 |
| Non-Adj. Channel Crosstalk | [dB] | −40 | −40 |
| Passband Ripple | [dB] | 1 | 1 |
| PDL | [dB] | 0.1 | 0.1 |
| Return Loss | [dB] | 40 | 40 |

Table 1 shows that the insertion loss (IL) of the WDM module is significantly higher than the sum of the bare filter losses; this is the penalty for entering and exiting all of the discrete 3-port packages. Similarly, the size, cost, and assembly time are quite high.

Accordingly, more recent development has been aimed at packaging the same TFFs in free-space, rather than with fiber interconnections. For example, see U.S. Pat. No. 5,859,717 to MA. Scobey et al., and/or UK Pat. Appl. GB 2014752 to K. Hashimoto et al., herein incorporated by reference. The basic idea is to route the optical signal along a zigzag path that is formed by two parallel rows of TFFs as schematically shown in FIG. 2. These free-space interconnects can in principle be lower in loss, smaller, and more quickly constructed than the traditional WDM module.

However, the commercialization of such free-space packaging of TFFs has been generally hindered by some technical difficulties. In particular, beam diffraction and the robustness of optical alignment have been major concerns.

For example, for optimum performance and ease of fabrication, TFFs may be used near normal incidence—typically 1.8 degrees to minimize the polarization dependence of the filter transmission. In order to physically separate the incident beams on adjacent filters via free-space propagation, the package length d between the filter rows must exceed half the filter width divided by the tangent of the incidence angle on the filters. For a typical filter size of ~1.5 mm, d becomes nearly 30 mm. If eight TFFs are cascaded, the total propagation length from input port to the last port becomes about 30×(8+1)=270 mm. Such a long propagation length will lead to diffraction of the optical beam and thus an increase of the beam diameter. For example, a Gaussian beam that has a diameter of 400 µm at its beam waist will have a diameter of about 780 µm at the propagation length of +/−135 mm from the beam waist. Such an increase in beam diameter makes it difficult to efficiently couple light back into lenses and then into fibers, leading to an excess insertion loss of the device. Accordingly, add/drop ports are generally limited to a relatively small number (e.g., four or less). Additionally, the long propagation length causes the optical alignment to be sensitive to a change in the incident beam angle. Therefore, the alignment robustness and reliability becomes another serious issue.

SUMMARY OF THE INVENTION

It is an object of the instant invention to provide a diffraction-compensated WDM using TTFs.

It is a further object of the instant invention to providing a diffraction-compensated WDM device that uses TTFs as concave mirrors, and that is more robust than prior art WDM devices using flat TTFs.

BRIEF DESCRIPTION OF THE DRAWINGS

Exemplary embodiments of the invention will now be described in conjunction with the drawings, in which.

It will be noted that throughout the appended drawings, like features are identified by like reference numerals.

DETAILED DESCRIPTION

Figure 1:
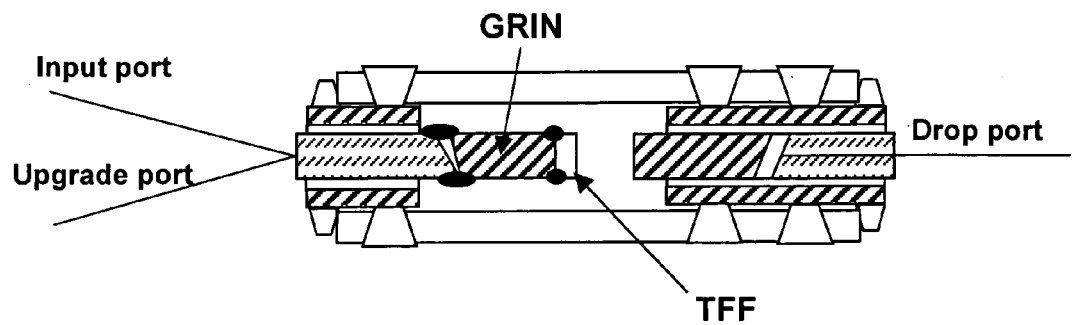
FIG. 1 is a schematic diagram illustrating a prior art WDM packaged as a single TFF in a three port device.
Figure 2:
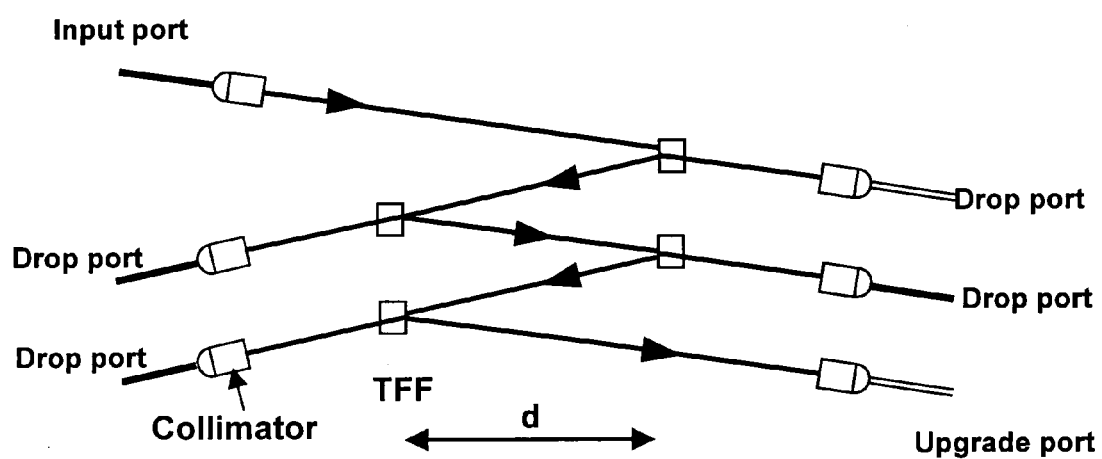
FIG. 2 is a schematic diagram illustrating another embodiment of a prior art WDM utilizing TFFs in free space.
Figure 3:
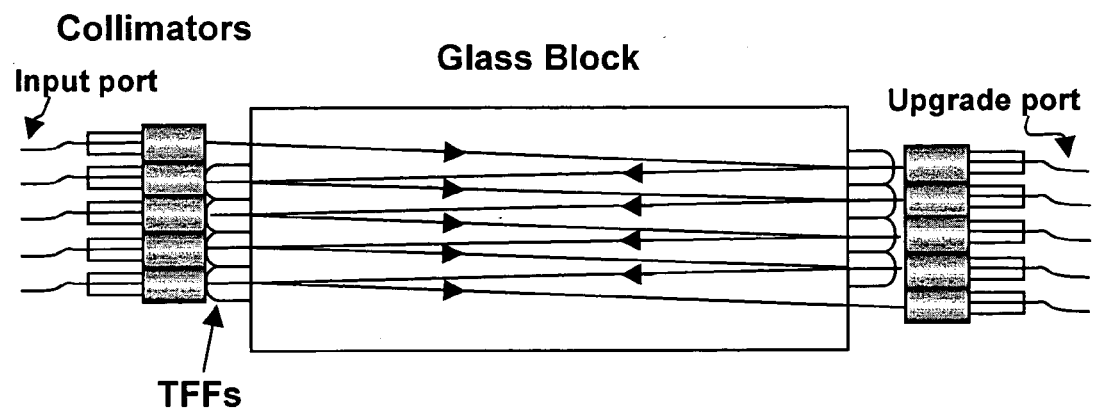
FIG. 3 is a schematic diagram illustrating an embodiment of a diffraction compensated integrated WDM device in accordance with the instant invention using TFFs.

Referring to FIG. 3, there is shown one embodiment of a dispersion compensated WDM device. The WDM includes an input port coupled to an input optical fibre, a plurality of intermediate ports coupled to intermediate optical fibres, and an upgrade or output optical port coupled to an upgrade optical fibre. Preferably, each optical fibre is a single mode optical fibre optically coupled to a collimator, which for example, is a graded index (GRIN) lens. A transparent glass block supports a first and a second plurality of TFFs, which are arranged on first and second parallel planes defined by opposite end faces of the glass block, so as to establish a zigzag optical path between the input optical fibre and the upgrade optical fibre via the first and second plurality of TTFs. The intermediate ports are either "add" or "drop" optical ports, depending upon the angle of the corresponding collimator. For example, if the WDM device is a demultiplexer the intermediate ports are angled to be drop ports, whereas if the WDM device is a multiplexer the intermediate ports are angled to be add ports. Optionally, each TFF has different spectral characteristics (e.g., different transmission band) from the others.

In accordance with the instant invention, each TFF of the first and second pluralities exhibits a curved surface for compensating for the diffraction of the optical beam along the zigzag path. The curved surface of the TFF is introduced by any appropriate method. For example H. Takahashi, in "Temperature stability of thin-film narrow-bandpass filters produced by ion-assisted deposition," Applied Optics, Vol.34 (1995), pp. 667–675, teaches a method of reducing the thermal dependence of the spectral characteristics of TFFs by choosing proper thermal properties for the substrate and thus introducing stress into the films. When this technique is used, the stress curves the surface of the TFF, such that each TFF typically has a radius of curvature of about 0.5 m to 1 m.

Figure 4:
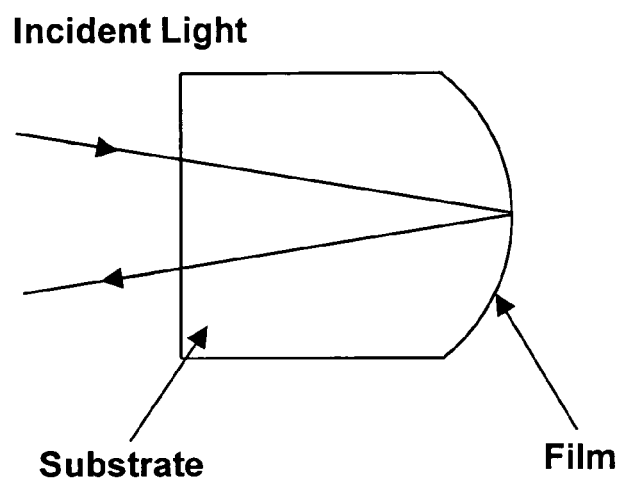
FIG. 4 is a schematic diagram of one of the TTFs shown in FIG. 3.

Preferably, each individual TFF is coupled to the glass block by, e.g., optical contacting, welding or bonding with adhesives, via the substrate side, such that the TFF is able to function as a concave mirror as shown in FIG. 4. Optionally, the surfaces of the TFFs and the glass block are coated to reduce reflection and/or improve adhesion. For example, one potential problem with such a reverse mount of the TFFs is an interference effect that is associated with the reflection at the boundary between the TFFs and the glass block. Such an interference effect may lead to a degradation of the optical signal. However, the interference effect can be suppressed by making the reflectivity at the boundary between the TFFs and the glass block sufficiently low, typically about 0.1% or lower. This can be achieved by a few methods: 1) by using the substrate of TFFs and the glass block that are index matched and by optically contacting them 2) by using an optically transparent adhesive that is index matched 3) by using optical anti-reflection coatings. Alternatively, a wedge angle in the order of 0.1 degree to 1 degree may be introduced to the substrate of TFFs.

Figure 5:
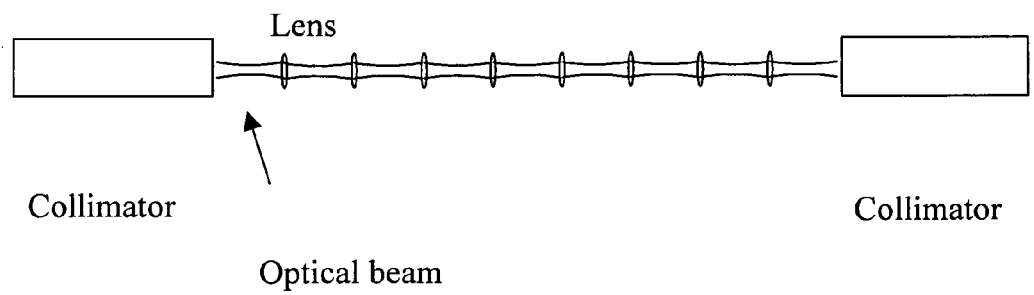
FIG. 5 is a schematic diagram of a convex lens system showing the principle of diffraction compensation.

Since each TFF provided within the zigzag optical path essentially functions as a concave mirror, the corresponding diffraction compensation is substantially analogous to the diffraction compensation provided by the convex lens system shown in FIG. 5. More specifically, since the diffraction effect decreases with the diameter of the collimated beam and increases with the propagation length, diffraction compensation is achieved by properly matching the beam diameter and propagation length to the curvature of convex lenses/curved TFFs. An optical beam from a typical single-mode fiber has a beam profile that is usually well approximated by a Gaussian distribution (G. P. Agrawal, "Fiber Communication Systems," $2^{nd}$ ed., John Wiley & Sons (1997), pp. 38–39). Thus one can use well-known Gaussian optics formula to derive the conditions for the diffraction compensation (B. E. A. Saleh and M. C. Teich, "Fundamental of Photonics," John Wiley and Sons (1991) Chapter 3). For example, for a beam diameter of 400 um, a wavelength of 1.55 um, a refractive index of 1.5 and a propagation length of 36 mm, the diffraction can be compensated for with TFFs that have curvature of radius of 0.86 m.

This diffraction compensation becomes increasing beneficial as the length of the optical path increases, as necessary, for example, when the WDM device is a demultiplexer for demultiplexing a large number of optical signal channels. For example, in one embodiment an N-channel input optical signal having wavelengths $\lambda_1$–$\lambda_n$ enters the device through the input fibre and is converted to a collimated beam by the collimator. The collimated beam of light propagates through the glass block to a first TFF that passes the channel having a wavelength $\lambda_n$, such that it is demultiplexed and output the first drop optical fibre. The remaining channels having wavelengths $\lambda_1$–$\lambda_{n-1}$ are reflected backwards through the glass block to the second TFF that passes the channel having the wavelength $\lambda_{n-1}$, such that it is demultiplexed and output the second drop optical fibre. This procedure is repeated for each of the remaining intermediate TTFs, which conveniently have spectral characteristics selected for the other n-3 channels, until the last channel $\lambda_1$ is demultiplexed and output the upgrade optical fibre.

Figure 6:
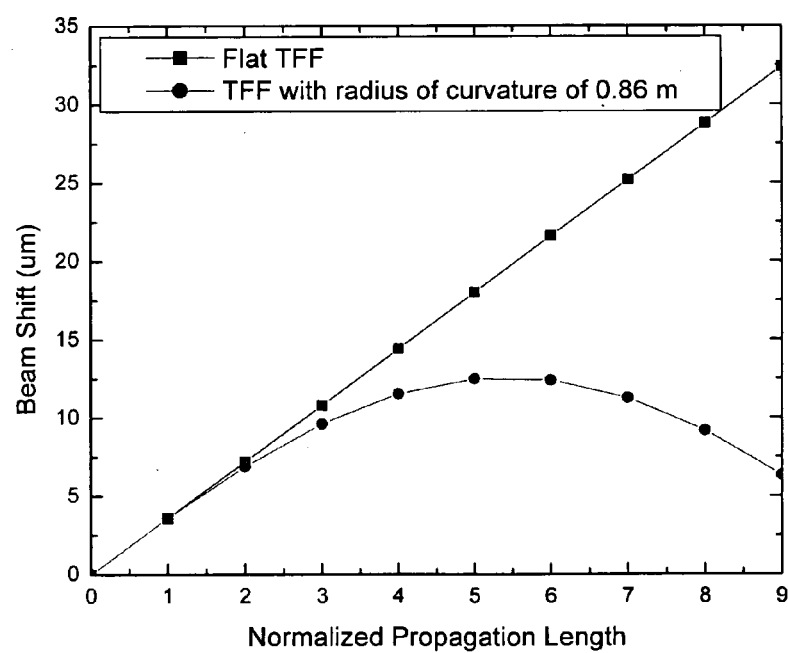
FIG. 6 is a schematic diagram of the beam shift as a function of propagating length.

One advantage of the embodiment illustrated in FIG. 3 is that the beam alignment becomes less sensitive to the change in the angle of the beam that is emitted from the input port collimator. This is intuitively understood by the fact that a lens system such as shown in FIG. 5 can be viewed as a light guide (B. E. A. Saleh and M. C. Teich, "Fundamental of Photonics," John Wiley and Sons (1991), pp. 16.). FIG. 6 shows the beam shift as a function of propagation length when the angle of the beam from input port collimator is changed by 0.1 mrad. Here, the propagation length is normalized by the distance between TFFs, which is assumed to be 36 mm.

Another advantage of the embodiment shown in FIG. 3 is that the collimators, or some of the collimators, on one side of the glass block can be constructed as an array. This is possible because the diffraction compensation enables one to use identical lenses for all the collimators and locate them on a same plane on one side of the glass block. There are various methods of constructing the array of collimators. One way is to first arrange the collimators (e.g., GRIN lenses) as an array and then to attach an individual fiber pigtail to each of the lenses. The lens array may be constructed by ion diffusion onto a glass substrate, bonding GRIN lenses together on their side, or placing GRIN lenses on V-grooves. Another way to construct the array of collimators is to first make an array of lenses and an array of fiber pigtails and then to assemble them together. The fiber array may be constructed by bonding fibers on V-grooves.

For practical reasons it is usually desirable to construct the array of collimators such that they are parallel to one another. However, since each of the intermediate ports between the input port and upgrade port can be either add or drop ports, the angle of the incident beam of light that is accepted/provided by the collimators should be variable. In order to keep the collimators parallel to each other and still maintain this add/drop distinction, one of the following approaches may be applied.

Figure 7:
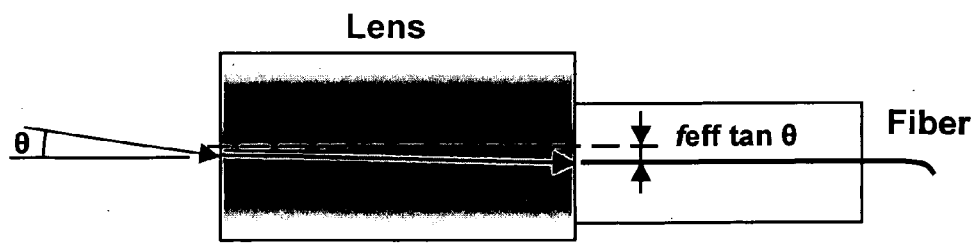
FIG. 7 is a schematic diagram of one embodiment of a collimator for use in the WDM device shown in FIG. 3.

In a first approach, the lateral position of fibers is adjusted relative to lenses so that the collimator accepts the incident beams at an oblique angle as shown in FIG. 7. In order to accept the ray that has an oblique incidence angle, the fiber is shifted relative to the central axis of the lens by the effective focal length of the lens times tangent of the incidence angle.

Figure 8:
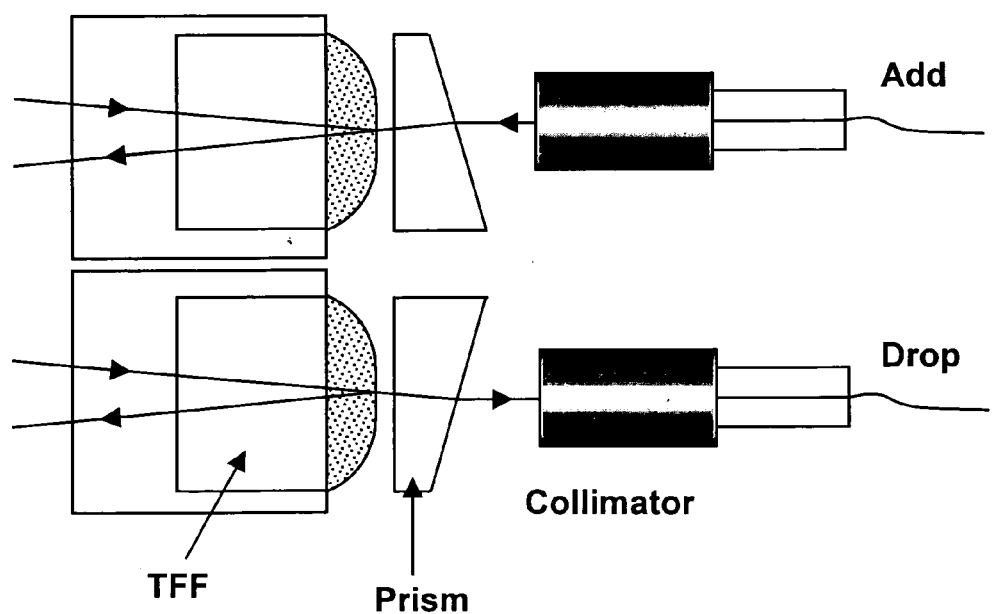
FIG. 8 is a schematic diagram of another embodiment of a collimator for use in the WDM device shown in FIG. 3.

In a second approach prisms are introduced between TFFs and collimators to make the beams parallel in front of the collimators as shown in FIG. 8. Optionally, the beam position is adjusted by changing the thickness of the prism.

Figure 9:
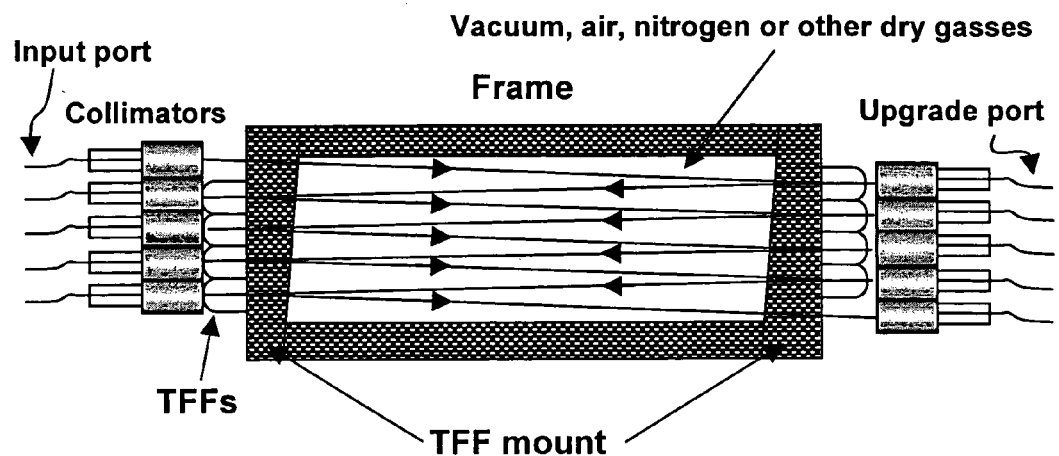
FIG. 9 is a schematic diagram illustrating another embodiment of a diffraction compensated integrated WDM device in accordance with the instant invention.

Referring to FIG. 9, there is shown another embodiment of a WDM device in accordance with the instant invention. The WDM device is similar to the embodiment shown in FIG. 3, except that a frame replaces the glass block. The frame includes TFF mounts for coupling to the TFFs. The TFF mounts are transparent at the signal channel wavelengths. Advantageously, this embodiment obviates passing the optical signal through a long optical path in a glass block which may lead to significant loss and aberration, and hence is suitable for large drop channel count. Optionally, the TFF mounts are provided with a wedge angle in the order of 0.1 degree to 1 degree in order to reduce interference effects due to reflection from the back surface of the TFF mounts.

Figure 10:
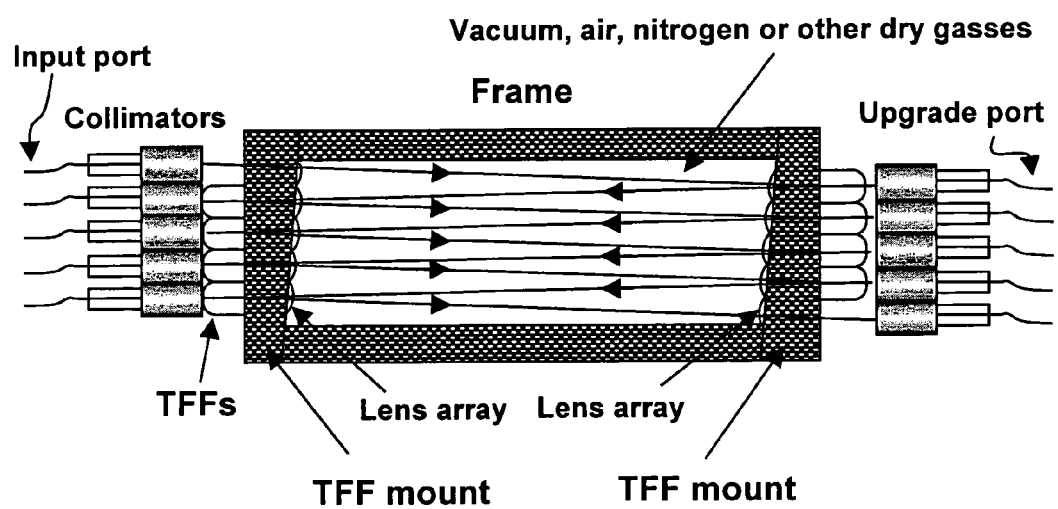
FIG. 10 is a schematic diagram illustrating another embodiment of a diffraction compensated integrated WDM device in accordance with the instant invention.

Referring to FIG. 10, there is shown another embodiment of a WDM device in accordance with the instant invention. The WDM device is similar to the embodiment shown in FIG. 9, but also includes lens arrays disposed within the frame for further diffraction compensation when the beam parameters and the curvature of the TFFs are not exactly matched for the diffraction compensation. For example, the lens array is optionally constructed by diffusing ions through a photolithographic mask into a glass substrate. Alternatively, the lens arrays is formed directly on the TFF mounts.

Figure 11:
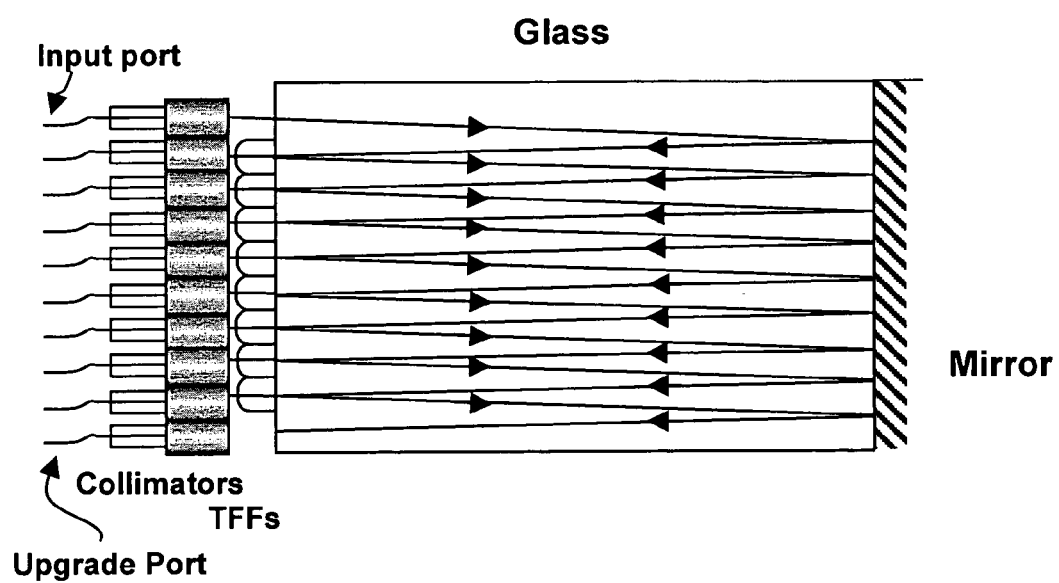
FIG. 11 is a schematic diagram illustrating yet another embodiment of a diffraction compensated integrated WDM device in accordance with the instant invention.

Referring to FIG. 11, there is shown yet another embodiment of a WDM device in accordance with the instant invention. The WDM device is similar to the embodiment shown in FIG. 3, wherein the second array of TFFs are replaced by a reflective surface, such as a mirror. This design allows all of the ports to be positioned on one side of the device.

In each of the above embodiments, the WDM device is smaller in size, has a potentially lower cost and higher manufacturing capacity through reduced labor time, and has a potentially lower loss and higher reliability through fewer fiber entries and exits, as compared to conventional WDM modules that use fiber-coupled three-port devices.

Furthermore, the WDM devices described in each of the above embodiments are not limited to a small number of add/drop ports due to diffraction, have improved reliability since the beam alignment is less sensitive to the change in the angle of the beam, and exhibit increased manufacturability since collimators on each side can be constructed as an array, as compared to other free-space TFF devices.

The embodiments of the invention described above are intended to be exemplary only. Of course, numerous other embodiments may be envisaged without departing from the spirit and scope of the invention. For example, the invention is not limited to the WDM devices illustrated herein, but also extends to WDM devices for optical switching and/or MEMS applications.

What is claimed is:

1. A wavelength division multiplexing device comprising: an input port for launching an optical signal; a plurality of filter elements for guiding the optical signal along a predetermined optical path, each filter element being transparent to a predetermined wavelength range and including compensating means for at least partially compensating for diffraction of the optical signal as it is guided along the predetermined optical path; an add/drop port optically coupled to each filter element for transmitting light within the predetermined wavelength range to or from the filter element to which it is optically coupled; and an output port for outputting the optical signal having been guided along the predetermined optical path, wherein each filter element comprises a thin film coated on a substrate, and wherein the compensating means comprises a curved surface of each thin film.

2. A wavelength division multiplexing device according to claim 1, comprising one of a glass block and a frame for supporting the plurality of filter elements.

3. A wavelength division multiplexing device according to claim 2, wherein each filter element is coupled to the one of the glass block and frame by optical contacting, the substrate of the filter element facing an outer end of the one of the glass block and frame.

4. A wavelength division multiplexing device according to claim 2, comprising a plurality of collimators, each collimator coupled to one of the input, add/drop, or output ports.

5. A wavelength division multiplexing device according to claim 4, wherein the plurality of collimators comprises a collimator array.

6. A wavelength division multiplexing device according to claim 4, wherein each collimator comprises a GRIN lens having an optical axis.

7. A wavelength division multiplexing device according to claim 6, comprising an optical fibre coupled to each GRIN lens for transmitting light to or from each port.

8. A wavelength division multiplexing device according to claim 7, wherein each optical fibre is shifted relative to the optical axis of each GRIN lens.

9. A wavelength division multiplexing device according to claim 7, comprising a prism between each filter element and each GRIN lens.

10. A wavelength division multiplexing device according to claim 2, comprising a reflective surface optically coupled to a first end of the one of the glass block, the plurality of filter elements optically coupled to a second opposing end of the glass block.

* * * * *